US009846949B2

(12) United States Patent
Moroney

(10) Patent No.: US 9,846,949 B2
(45) Date of Patent: Dec. 19, 2017

(54) DETERMINE THE SHAPE OF A REPRESENTATION OF AN OBJECT

(71) Applicant: Hewlett-Packard Development Company, L.P., Fort Collins, CO (US)

(72) Inventor: Nathan Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/036,796

(22) PCT Filed: Nov. 27, 2013

(86) PCT No.: PCT/US2013/072212
§ 371 (c)(1),
(2) Date: May 13, 2016

(87) PCT Pub. No.: WO2015/080723
PCT Pub. Date: Jun. 4, 2015

(65) Prior Publication Data
US 2016/0284104 A1 Sep. 29, 2016

(51) Int. Cl.
*G06K 9/46* (2006.01)
*G06T 7/60* (2017.01)
*G06K 9/48* (2006.01)
*G06K 9/62* (2006.01)
*G06T 7/12* (2017.01)
*G06T 7/64* (2017.01)
*G06T 7/136* (2017.01)

(52) U.S. Cl.
CPC ........... *G06T 7/604* (2013.01); *G06K 9/48* (2013.01); *G06K 9/6204* (2013.01); *G06T 7/12* (2017.01); *G06T 7/136* (2017.01); *G06T 7/64* (2017.01)

(58) Field of Classification Search
CPC ........... G06T 7/604; G06T 7/64; G06T 7/136; G06T 7/12; G06K 9/48; G06K 9/46; G06K 9/6204
See application file for complete search history.

(56) References Cited

U.S. PATENT DOCUMENTS 6,711,282 B1    3/2004  Liu et al.
6,941,016 B1    9/2005  Wagman et al.
(Continued)

FOREIGN PATENT DOCUMENTS

EP      2309456 A1   4/2011

OTHER PUBLICATIONS

Schindler, K. et al, "Object Detection by Global Contour Shape", Jul. 28, 2009.
(Continued)

*Primary Examiner* — Ali Bayat
(74) *Attorney, Agent, or Firm* — HP Inc. Patent Department

(57) ABSTRACT

Examples disclosed herein relate to determining the shape of an object representation. In one implementation, a processor determines contours of a silhouette of an object representation above a contour degree threshold, where a contour degree is determined based on the area of the contour with respect to itself. The processor may identify a shape type of the object representation based on a comparison of the determined contours to shape definition information.

20 Claims, 3 Drawing Sheets

(56) References Cited

U.S. PATENT DOCUMENTS

| | | | | |
|---|---|---|---|---|
| 6,956,961 B2 * | 10/2005 | Cong | ............... | G01N 15/14 |
| | | | | 382/133 |
| 7,162,105 B2 * | 1/2007 | Bober | ............... | G06F 17/30259 |
| | | | | 382/199 |
| 7,710,422 B2 | 5/2010 | Matskewich et al. | | |
| 8,280,136 B2 * | 10/2012 | Gotardo | ............... | G06K 9/6207 |
| | | | | 378/4 |
| 8,422,782 B1 | 4/2013 | Dhua et al. | | |
| 8,682,071 B1 * | 3/2014 | Dhua | ............... | G06K 9/4671 |
| | | | | 382/170 |
| 9,135,522 B2 * | 9/2015 | Akagunduz | ............... | G06K 9/48 |
| 9,189,854 B2 * | 11/2015 | Dhua | ............... | G06K 9/4671 |
| 9,422,782 B2 * | 8/2016 | McWhorter | ............... | E21B 33/064 |
| 9,507,803 B2 * | 11/2016 | Sud | ............... | G06F 17/30864 |
| 2004/0131254 A1 | 7/2004 | Liang et al. | | |
| 2006/0171581 A1 | 8/2006 | Blaine | | |
| 2007/0063707 A1 | 3/2007 | Van Berkel | | |
| 2014/0052407 A1 * | 2/2014 | Ladd | ............... | G01B 13/16 |
| | | | | 702/167 |

OTHER PUBLICATIONS

Szeliski, R. et al, "Robust Shape Recovery from Occluding Contours Using a Linear Smoother", Dec. 1993.
Zhengping, H et al, "Object Detection Based on Sparse Contour Spread Shepe Script Model", Mar. 2, 2011.

* cited by examiner

DETERMINE THE SHAPE OF A REPRESENTATION OF AN OBJECT

BACKGROUND

Automatic object recognition has many applications. For example, automatically identifying objects in an image may be useful for analyzing surveillance video or other types of video or image. Determining the presence of signs, a particular background, or a particular object in an image may be helpful to automatically determine the content of an image. In one implementation, an object may be recognized from a 3D print file to determine the type of object to be printed.

BRIEF DESCRIPTION OF THE DRAWINGS

The drawings describe example embodiments. The following detailed description references the drawings, wherein.

DETAILED DESCRIPTION

The shape of an object may be automatically determined by identifying and connecting contours along, the outline of the object. For example, points, such as pixels or data points, a particular distance apart along the outline of an object may be compared to one another to determine if their relative position indicates the presence of a contour along the outline. In one implementation, the outline of the object is represented by data points indicating the position of the outer portions of the object, such as an STL file to be printed by a 3D printer. The outline may be, for example, an outline of an object in an image. A contour threshold may be used such that contours below the threshold are assumed to be straight lines such that small variations in contour may not be identified as contours. In some cases, the shape of the object may be identified based on the determined contours of the object silhouette. For example, an object with a shape including three convex contours may be identified as a triangle. Further processing may be performed, such as to analyze text on a triangular shaped object in an image to determine if the triangular shaped object is a traffic warning sign. The method may allow for a fast automated method for object shape identification, for example, due to the fact that a subset of points of the silhouette are analyzed and that contours below the threshold are not identified as contours.

Figure 1:
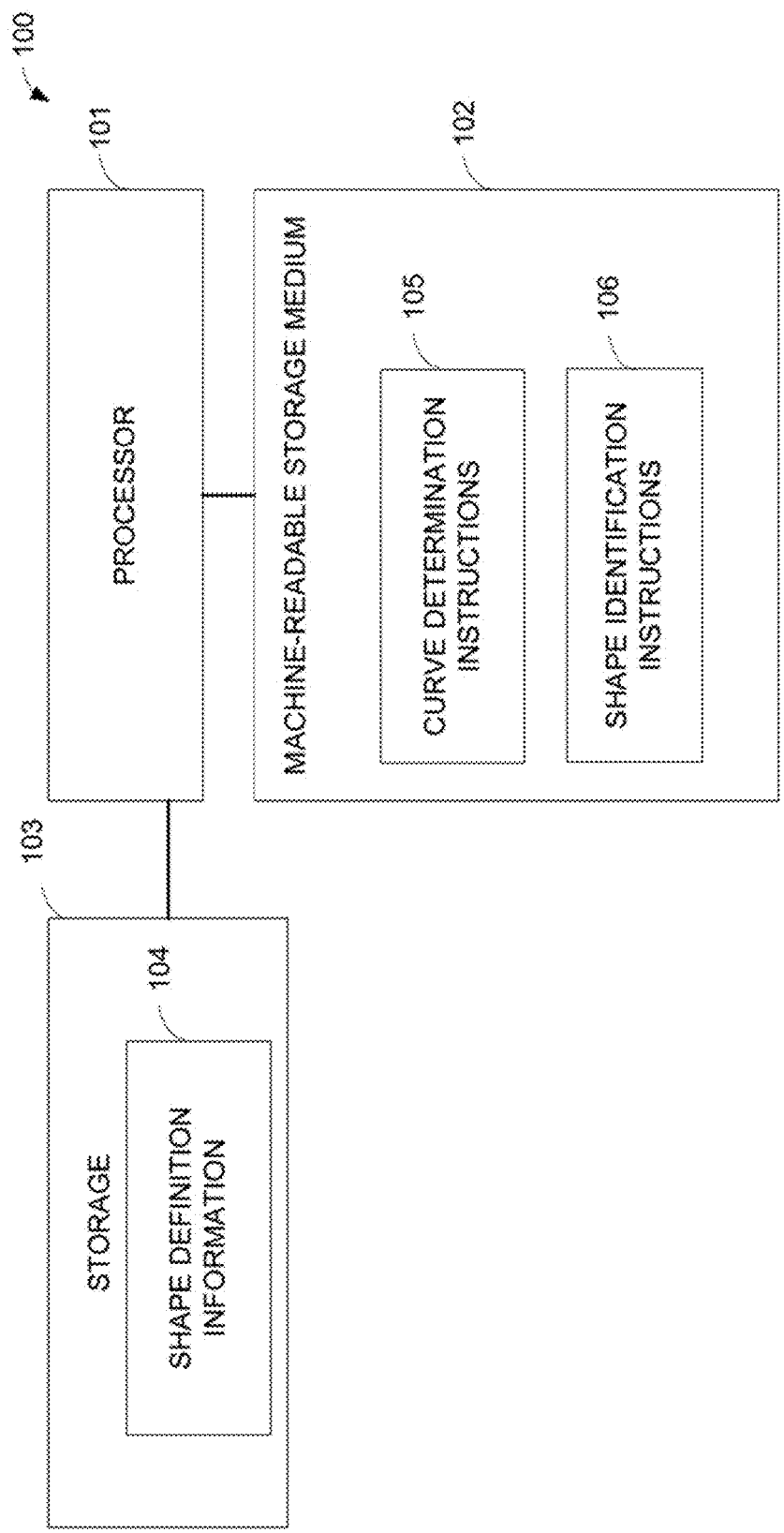
FIG. 1 is a block diagram illustrating one example of a computing system to determine the shape of an object representation.

FIG. 1 is a block diagram illustrating one example of a computing system to determine a shape of an object representation. The computing system 100 may determine a description of the shape of the silhouette of an object representation based on an analysis of the contours of the silhouette. For example, the contours associated with the object with a contour greater than a threshold may be determined, and the remaining, portions of the silhouette of the object representation may be assumed to be linear. The computing system 100 includes a processor 101, a machine-readable storage medium 102, and a storage 103.

The storage 103 may store shape definition information 104 to be accessed by the processor 101. The processor 101 may be included in the same electronic device as the storage 103 or may communicate with the storage 103 via a network. The shape definition information 104 may include images of objects to be compared to determined shape description information of objects. The shape definition information 104 may include criteria related to a particular object type. The criteria may include the number and/or position of contours associated with the shape of an object type. For example, a hexagon may be associated with criteria for 6 concave contours that are approximately equidistance from one another.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include contour determination instructions 105 and shape identification instructions 106.

The contour determination instructions 105 may include instructions to identify contours associated with the object representation. For example, the silhouette of an object representation may be traversed. The traversal may sample a subset of points, such as each point a particular distance apart. The points may be, for example, pixels or data points. The position of the points may be compared to one another. For example, three adjacent sample points may be compared to determine the area under a triangle formed by the three points. If the area is above a threshold, the three points may be identified as part of a contour. A linear line may be associated or fit on portions of the silhouette between the identified contours. For example, portions of the silhouette with an area with respect to itself below the threshold may be assumed to be linear such that both straight lines and small contours are assumed to be flat regions.

The shape description determination instructions 106 may include instructions to compare the flat and non-flat regions of the object representation silhouette as determined by the contour determination instructions 105 to the shape definition information 104. For example, the number and/or position of contours of the object may be compared to the shape definition information 104. A shape outline created by connecting the determined contours may be compared to a library of shape images. A shape outline created by connecting the determined curves may have fewer curves than the actual silhouette due to the contour threshold and the analyzing of a subset of the silhouette points. The simplified shape outline may be compared to shape images. The object shape may be determined based on the comparison to the shape images and/or comparison to the contour information. Determining the shape may involve determining the overall shape of the object representation and/or local shape information related to a portion of the outline of the object representation. For example, when determining the shape of an object to be printed using 3D printing technology, the shape of a portion of the object representation from a particular viewpoint may be determined.

Figure 2:
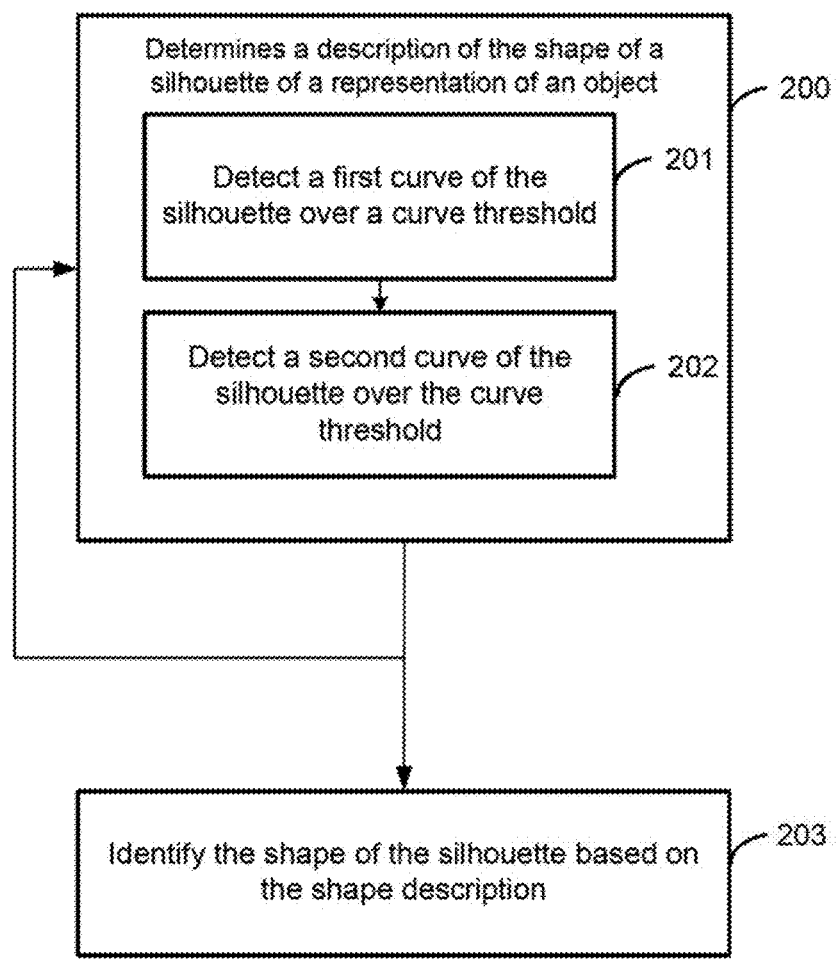
FIG. 2 is a flow chart illustrating one example of a method to determine the shape of an object representation.

FIG. 2 is a flow chart illustrating one example of a method to determine the shape of an object representation. The silhouette of the object in the image may be determined using any suitable method for segmenting an image. In one implementation, the silhouette is determined by connecting points along a triangular mesh of a 3D print STL file. A description of the shape of silhouette may be determined based on the contours of the silhouette, and the description may be used to identify the shape of the silhouette, such as a standard shape or a type of object. For example, the number and/or position of the contours and connecting lines may be used to identify the object. The method may be implemented, for example, by the processor 101 of FIG. 1.

Beginning at 200, a processor determines a description of the shape of a silhouette of a representation of an object. For example, the silhouette may be traced in a manner to locate global and local contours. The silhouette may be any suitable silhouette of an object representation. For example, the object may be segmented from the background of an image or region of interest in an image, such as a photographic image or video image. In some implementations, the silhouette is determined based on the triangular representations in a 3D print STL file. Points, such as pixels or data points, a particular distance apart along the silhouette of the segmented image may be compared to one another such that each point along the silhouette is not analyzed. The silhouette may be a silhouette of a portion of the object representation. For example, local shapes of the object representation may be determined, such as where the silhouette represents a silhouette of an object representation for 3D printing from a top view. The silhouette may be a portion of the object representation, such as a silhouette of a tire on a model car representation for 3D printing.

The distance may be based on a type of image, object, and/or final 3D print product. The distance may be based on a position along the silhouette, such as where more points are analyzed using a smaller distance near outer corners of the object silhouette. The distance may be based on the detail desired for the number of contours. For example, sampling points a greater distance apart may result in fewer contours identified because some contours smaller than the distance are not identified. The analyzed points may be compared to one another to locate contours along the silhouette. Determining information about the shape of the silhouette may include detecting a first and second contour and inferring or creating a line to create the two contours.

At 201, the processor detects a first contour of the silhouette wherein the area of the contour with respect to itself is over a contour threshold. For example, the contour may be detected based on an analysis of the relative location of the points to determine an area of a contour with respect to itself where the potential contour is created by connecting the analyzed points. The area of the contour with respect to itself may be determined, for example, based on an area of a triangle created between the analyzed silhouette points. The area of the contour may be determined relative to itself instead of or in addition to its relation to other portions of the image and/or object. The sign of the area of the contour may be used to determine whether the contour is concave or convex. As an example, the area of the triangle created by the points may be determined by $Area_{Triangle} = |A_x(B_y - C_y) + B_x(C_y - A_y) + C_x(A_y - B_y)|/2$, where A, B and C are the three points analyzed along the silhouette and the x and y values represent the locations of the points. The three points of the triangle may be adjacent sampled points and/or points with sampled points between them. For example, once a contour above the threshold is identified, additional points may be compared to merge with the contour. If the area under the triangle is zero, close to zero, or otherwise under the contour threshold, the portion of the silhouette is assumed to be linear. If not, the portion is assumed to be a contour.

The contour threshold may be automatically created and/or determined based on user input. The contour threshold may be dynamically determined based on the type of silhouette, image, or object. The contour threshold may be set to allow for larger contours to be identified without using information about small contours below the threshold that may not provide valuable information about the overall shape of the object. The contour threshold may be automatically set according to a performance speed goal and/or a contour sensitivity goal.

At 202, the processor detects a second contour of the silhouette wherein the area of the contour with respect to itself is over the threshold. The processor may perform a global sweep of the silhouette of the object representation and compare a previous contour to the next points along the silhouette. In some cases, the new contour may be merged with the previously identified contour. For example, the distance between the points of the contour may be taken into account in determining whether the contours should be merged. For example, a second contour with an area with respect to itself over the threshold may be determined to be part of a previously identified contour such that one of the end points of the previous contours becomes the end point of the second contour. In some cases, there may be points in between the two contours such that the contour is determined to be a separate new contour.

The processor may determine contours in different portions of the silhouette by traversing points along the silhouette of the image. For example, the processor may analyze the points across the height and then width of the silhouette, or vice versa. The processor may analyze the silhouette based on four global corners of the silhouette determined to find the outer portions of the object and then analyze the points in between the global corners for additional contours. For example, first corners may be determined to orient the outer portions of the silhouette in a global sweep and then corners within those outer limits. The processor may analyze every j points or j distance across the width of the silhouette until a contour is found or the width of the silhouette is found. At that point, the next point 90 degrees from the last analyzed point may be analyzed. The processor may analyze the silhouette every j points until a contour is found or the width of the silhouette is reached. There may be some redundancy in the contours found, and the contours along the corner may be merged. In one implementation, the processor continues to look for points along a path and then performs a separate sweep to analyze points within the outer portion. For example, in the case of a martini glass the processor may find the top right rim of the glass and the bottom right portion of the stem before filling in the triangular shaped contour of the glass. In one implementation, the processor analyzes points along a third dimension, such as for a three-dimensional image.

In one implementation, the processor further performs a sweep of inner portions of the object representation, such as based on a the same contour threshold used for the outer portion or based on a second contour threshold, to determine contours of inner portions of the object representation. As an example, a picture frame as opposed to a typical square may include both four outer contours and four inner contours.

The processor may create a line connecting the first contour and the second contour. For example, information about the position of the points that are not associated with the identified contours may be discarded such that a straight line is automatically drawn between the identified contours. The linear regions may be inferred based on the contours or fit. The linear regions may be based on gaps in the identified contours. The linear regions may be associated as the silhouette is traversed or after some or all of the contours have been identified. For example, the contours across the height and width of the silhouette may be connected.

At 203, the processor identifies the shape of the silhouette based on the shape description. The shape may be any suitable shape. The shape may be two-dimensional or three-dimensional. The shape may be a traditional shape and/or the shape of an object. For example, the shape may be an octagon or may be a couch.

In one implementation, the processor identifies the shape based on the number, position, and/or type (ex. concave vs. convex) of the contours. For example, an object with six contours may be identified as a hexagon. Additional information about the degree of a contour, size of a linear portion, and/or relative position of the contours may be used to determine the shape. In one implementation, the description of the object is compared to a library of images of shapes, and an object is identified based on a matching image. The linear and contour regions form a more simplistic shape than the overall silhouette, and the formed shape may be compared to the image library. The identified object may be used in visual search, robotics, or other image sensing technologies.

In one implementation, a known shape can be searched for using the method. For example, different objects in an image may be segmented, and the shape of the different objects may be determined to search for a particular shaped object, such as a particular building shape in a video.

Additional processing may be performed based on the determined shape. For example, hexagons in image may be identified, and text processing may be performed on the hexagons to identify those that are stop traffic signs.

In one implementation, the method may be used to smooth a 3D print object representation, such as 3D coordinates of a triangular mesh representation from an STL file, such that the object representation may be categorized as a particular shape type or object. The 3D printer may then print the categorical shape such that the shape is printed in a smoother manner with fewer contours.

Figure 3B:
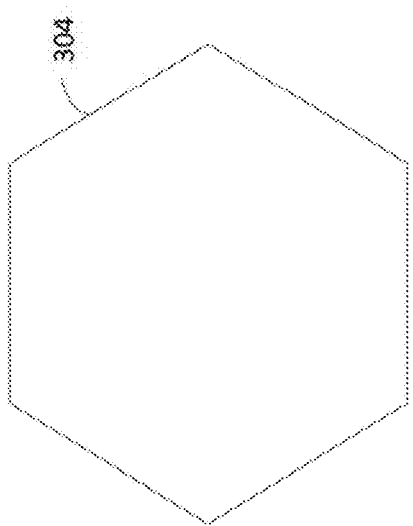
FIG. 3B is a diagram illustrating one example of determining the shape of an object in an image.
Figure 3A:
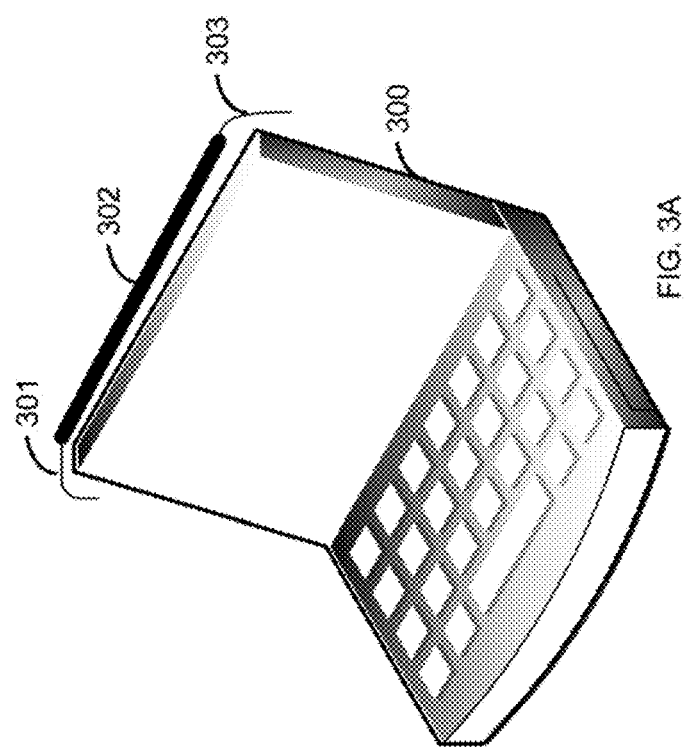
FIG. 3A is a diagram illustrating one example of determining the shape of an object in an image.

FIG. 3A is a diagram illustrating one example of determining the shape of an object in an image. Object 300 is a laptop. Contours 301 and 303 are identified, and they are connected with line 302. Small contours between contours 301 and 303 may be discarded because they are below a contour threshold. The laptop 300 includes 6 contours, some concave and some convex.

FIG. 3B is a diagram illustrating one example of determining the shape of an object in an image. For example, the hexagon 304 includes 6 contours. The hexagon 304 may be identified as a hexagon instead of a laptop based on the fact that all of the contours are concave and/or based on the equidistance between the identified contours. Determining a shape of an object based on contours above a threshold may provide a fast method for identifying a shape by not considering all small curves along the outline of an object. The contour information may be used to quickly compare the object or criteria related to the object to stored shape information.

The invention claimed is:

1. A computing system, comprising:
   a storage to store shape definition information; and
   a processor to:
   determine contours of a silhouette of an object representation above a contour degree threshold, wherein a contour degree is determined based on the area of the contour with respect to itself; and
   identify a shape type of the object based on a comparison of the determined contours to the image shape definition information,
   wherein the processor is further to determine silhouette information of an inner portion of the object representation based on a second contour degree threshold.

2. The computing system of claim 1, wherein the object representation comprises coordinates related to a file for printing an object using 3D printing technology.

3. The computing system of claim 1, wherein the processor selects a type of additional processing on the object representation based on the identified shape type.

4. The computing system of claim 1, wherein determining contours of a silhouette comprises:
   determining a first contour in a first direction associated with the width of the silhouette; and
   determining a second contour in a second direction associated with the height of the silhouette.

5. The computing system of claim 1, wherein determining a contour comprises:
   comparing three points along the silhouette a particular distance apart; and
   identifying the three points as part of a contour where the area of a triangle created between the three points is above the contour degree threshold.

6. A method, comprising:
   determining, by a processor, a description of a shape of a silhouette of a representation of an object, including:
   detecting a first contour of the silhouette wherein the area of the first contour with respect to itself is over a contour threshold; and
   detecting a second contour of a portion of the silhouette wherein the area of the second contour with respect to itself is over the contour threshold; and
   identifying the shape of the silhouette based on the shape description.

7. The method of claim 6, wherein determining a description of the shape of the silhouette comprises:
   determining a description of the shape a portion of the silhouette in a first direction associated with the width of the silhouette; and
   determining a description of the shape of a portion of the silhouette in a second direction associated with the height of the silhouette.

8. The method of claim 7, wherein identifying the type of object comprises identifying the type of object based on at least one of the number and position of contours in the silhouette.

9. The method of claim 6, wherein detecting the first contour comprises:
   comparing three points along the silhouette a particular distance apart; and
   identifying the three points as part of a contour where the area of a triangle created between the three points is above the contour threshold.

10. The method of claim 6, further comprising merging the first contour and the second contour into a single contour.

11. The method of claim 6, further comprising identifying the type of object based on the shape of the silhouette.

12. The method of claim 6, further comprising determining the shape of an inner portion of the silhouette based on a second contour threshold.

13. The method of claim 6, further comprising determining whether a detected contour is concave or convex.

14. A machine-readable non-transitory storage medium comprising instructions executable by a processor to:
   determine contoured regions of a silhouette of a representation of an object wherein the contoured regions have a contour with an area with respect to itself above a threshold;
   determine the shape of an inner portion of the silhouette based on detecting contour regions having a contour with an area with respect to itself above a second threshold; and
   recognize the shape of the silhouette based on a comparison of the contour region information to shape information.

15. The machine-readable non-transitory storage medium of claim 14, wherein the representation of the object comprises coordinates related to a file for printing the object using 3D printing technology.

16. The machine-readable non-transitory storage medium of claim 14 wherein instructions to recognize the silhouette comprise instructions to:
   determine a description of the shape a portion of the silhouette in a first direction associated with the width of the silhouette; and
   determine a description of the shape of a portion of the silhouette in a second direction associated with the height of the silhouette.

17. The machine-readable non-transitory storage medium of claim 14, wherein instructions to determine a contour region comprises instructions to:
   compare three points along the silhouette a particular distance apart; and
   identify the three points as part of a contour region where the area of a triangle created between the three points is above the contour threshold.

18. The machine-readable non-transitory storage medium of claim 14, further comprising instructions to merge a first and second determined contour region into a single contour region.

19. The machine-readable non-transitory storage medium of claim 14, wherein instructions to recognize the shape comprise instructions to recognize the shape based on at least one of the number and position of contours in the silhouette.

20. The machine-readable non-transitory storage medium of claim 14, further comprising instructions to determine whether a contour within a contour region is concave or convex.

* * * * *